United States Patent [19]

Leung

[11] Patent Number: 5,598,542

[45] Date of Patent: Jan. 28, 1997

[54] METHOD AND APPARATUS FOR BUS ARBITRATION IN A MULTIPLE BUS INFORMATION HANDLING SYSTEM USING TIME SLOT ASSIGNMENT VALUES

[75] Inventor: Wan L. Leung, Coral Springs, Fla.

[73] Assignee: International Business Machines Corporation, Armonk, N.Y.

[21] Appl. No.: 287,213

[22] Filed: Aug. 8, 1994

[51] Int. Cl.$^6$ .................................................. G06F 13/372
[52] U.S. Cl. ........................... 395/297; 395/729; 395/865
[58] Field of Search .................................. 395/287–305, 395/728–732, 860, 861, 865

[56] References Cited

U.S. PATENT DOCUMENTS

| | | | |
|---|---|---|---|
| 4,334,288 | 6/1982 | Bocher | 395/301 |
| 4,339,808 | 7/1982 | North | 395/732 |
| 4,473,880 | 9/1984 | Budde et al. | 395/292 |
| 4,511,959 | 10/1986 | Nicolas et al. | 395/300 |
| 4,620,278 | 10/1986 | Ellsworth et al. | 395/299 |
| 4,682,285 | 7/1987 | Ozil et al. | 395/860 |
| 4,719,567 | 1/1988 | Whittington et al. | 395/297 |
| 4,785,394 | 11/1988 | Fischer | 395/294 |
| 4,969,120 | 11/1990 | Azevedo et al. | 395/297 |
| 4,977,557 | 12/1990 | Phung et al. | 370/85.6 |
| 5,168,568 | 12/1992 | Thayer et al. | 395/305 |
| 5,195,185 | 3/1993 | Marenin | 395/303 |
| 5,241,632 | 8/1993 | O'Connell et al. | 395/297 |
| 5,416,910 | 5/1995 | Moyer et al. | 395/293 |
| 5,440,699 | 8/1995 | Sindhu et al. | 395/200.08 |

Primary Examiner—Jack B. Harvey
Assistant Examiner—Paul R. Myers
Attorney, Agent, or Firm—George E. Grosser

[57] ABSTRACT

In a computer system having a central processing unit (CPU) in circuit communication with a memory via a memory bus and having first and second peripheral bus controllers generating first and second dissimilar peripheral buses, a multibus arbiter is provided for arbitrating access of a memory bus between the two dissimilar buses. The multibus arbiter has an assignment register, a time slot pointer, and an arbitration circuit. The length of the assignment register and time slot pointer controls the granularity of control of accesses to the memory bus by the peripheral buses. The assignment register holds a multibit assignment value that determines which of the two peripheral buses will be given access to the memory bus for a given time slot during contention. The time slot pointer selects one of the bits of the assignment register and points to a different bit responsive to both peripheral buses requesting access to the memory bus at the same time and one of said peripheral bus arbiters indicating that the current access of the memory bus is complete.

14 Claims, 12 Drawing Sheets

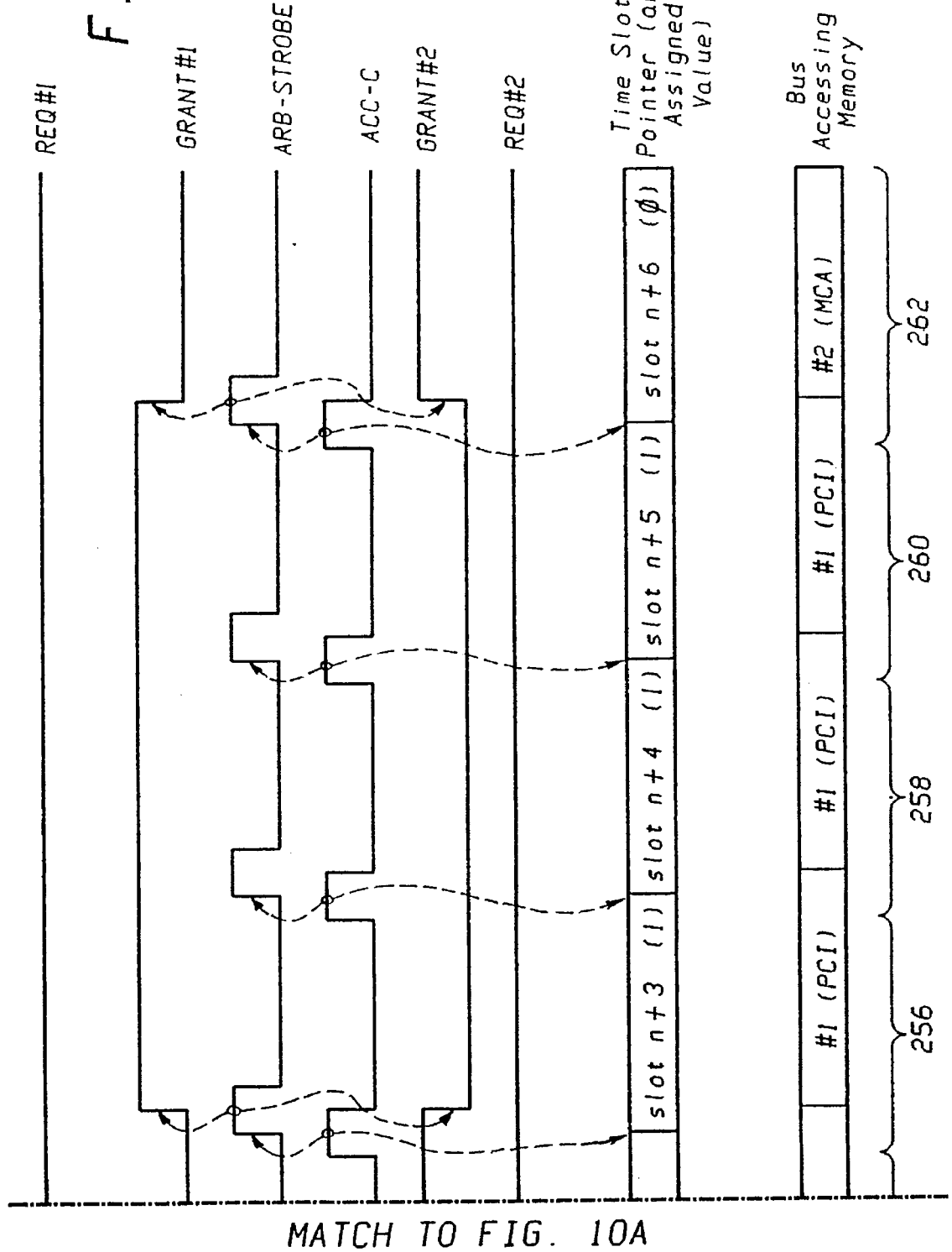

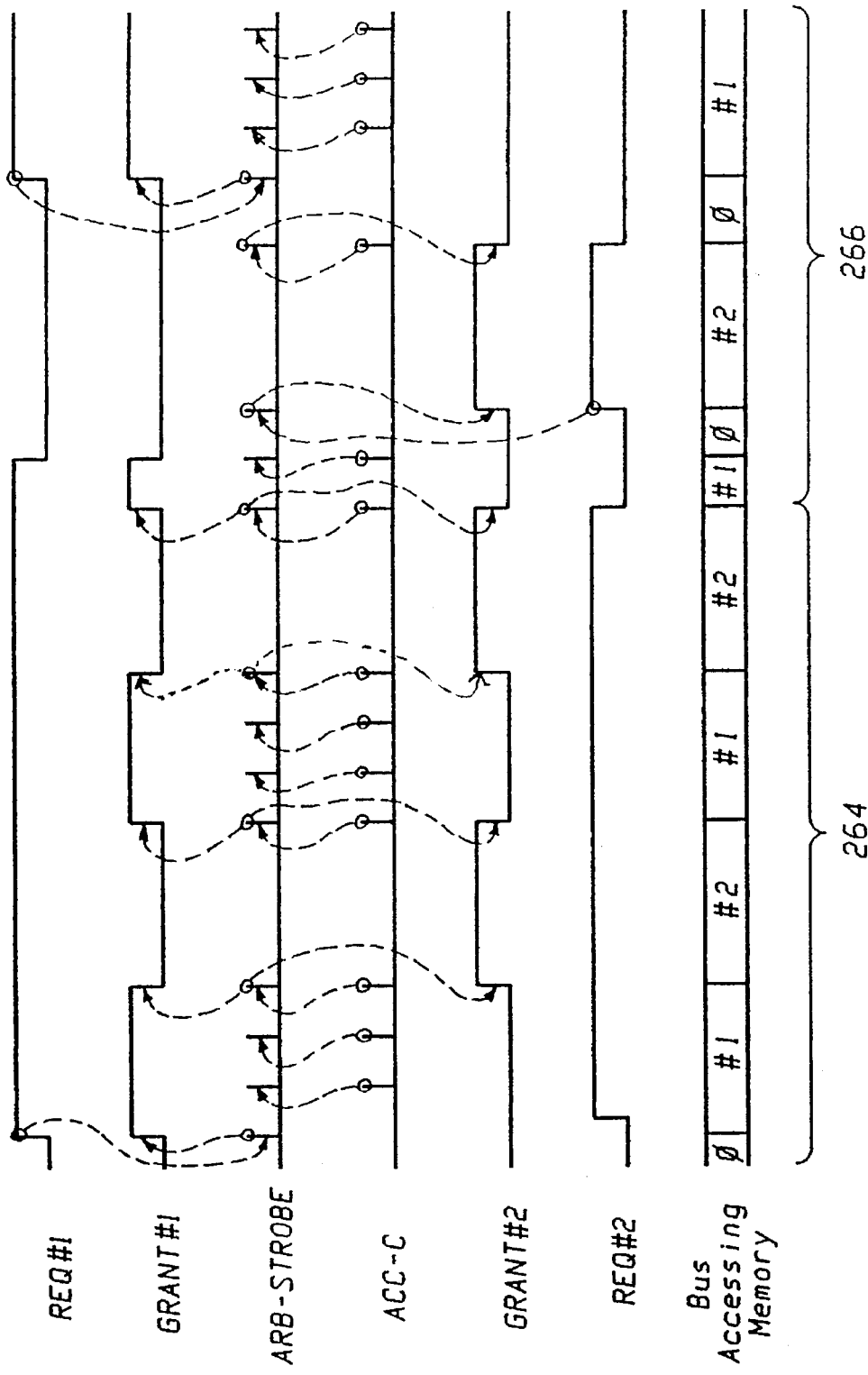

METHOD AND APPARATUS FOR BUS ARBITRATION IN A MULTIPLE BUS INFORMATION HANDLING SYSTEM USING TIME SLOT ASSIGNMENT VALUES

FIELD OF THE INVENTION

The present invention relates generally to computer system architecture and, more specifically, to a multibus dynamic arbiter for arbitration between two buses.

BACKGROUND OF THE INVENTION

Personal computer systems are well known in the art. Personal computer systems in general, and IBM Personal Computers in particular, have attained widespread use for providing computer power to many segments of today's modern society. Personal computers can typically be defined as a desktop, floor standing, or portable microcomputer that is comprised of a system unit having a single central processing unit (CPU) and associated volatile and non-volatile memory, including all RAM and BIOS ROM, a system monitor, a keyboard, one or more flexible diskette drives, a fixed disk storage drive (also known as a "hard drive"), a so-called "mouse" pointing device, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT (IBM PC/AT), IBM's PERSONAL SYSTEM/1 (IBM PS/1), and IBM's PERSONAL SYSTEM/2 (IBM PS/2).

Personal computer systems are typically used to execute software to perform such diverse activities as word processing, manipulation of data via spread-sheets, collection and relation of data in databases, display of graphics, design of electrical or mechanical systems using system-design software, etc.

In such computer systems, the components communicate via electrical signals. These electrical signals are typically carried by electrical connections between the system components. Typical types of electrical connections include metal traces on a printed circuit board (PCB), vias between different levels of multilayer PCBs, plated through holes, plugs, and individual wires connected from pin to pin of system components. Typically groups of electrical signals and groups of electrical connections which carry the electrical signals are referred to as a "bus." Thus, a reference to a "bus" can indicate a reference to a group of electrical signals, a group of electrical connections which carry the electrical signals, or a reference to both a group of electrical signals which form a protocol and a group of electrical connections which carry the electrical signals. Buses are made up of "bus lines." A reference to an individual "bus line" may refer to an electrical connection of a bus or an electrical signal of a bus.

Typical computer systems have several distinct buses: a host processor bus, a memory bus, and one or more peripheral buses. The host processor bus is unique to each processor and dictated by the architecture of that processor. The memory bus is usually standardized to one of several memory buses to allow common, inexpensive memory units to be used. For example, many systems of widely different architectures are designed to use common single in-line memory modules (SIMMs). The peripheral bus(es) have evolved into a number of standards. The Industry Standard Architecture (ISA) bus, the "MICROCHANNEL" Architecture (MCA) bus, and the Peripheral Component Interconnect (PCI) bus, are examples of very well known peripheral buses.

The buses in a system typically must share resources across the various buses. For example, both the host processor bus and the peripheral bus typically must have access to the memory bus. To avoid conflicts between buses attempting to access the same bus, arbiters are designed to arbitrate between the two or more buses requesting access to the same bus.

The current trend in the computer industry is to design systems with more than one peripheral bus, e.g., a system with a PCI bus and an ISA bus. Such systems can become complicated because the arbiters must take into account both peripheral buses when arbitrating accesses to the memory bus.

A particularly complicated system is a system having a PCI bus and an MCA bus. Both the PCI bus and the MCA bus allow bus masters to assume control of that particular bus. Therefore, both of these buses have arbiters for arbitrating control of their respective buses. Thus, a system with a PCI bus and an MCA bus must have four arbiters: (1) the memory bus arbiter, (2) the PCI bus arbiter, (3) the MCA bus arbiter, and (4) a multibus arbiter for arbitrating between the PCI bus arbiter and the MCA bus arbiter. Thus, the PCI bus arbiter and the MCA bus arbiter must be interfaced with the memory arbiter to determine which of the many bus masters may access the memory bus at any one time.

This particular configuration is even more complicated because the PCI bus and the MCA bus use different criteria for determining how their respective bus masters are given control of their respective buses. The MCA bus masters are designed to stay on the bus as long as possible to optimize bus utilization. On the other hand, the PCI bus is a packet bus; PCI bus masters are designed to acquire the bus, perform a short high-speed transfer, and leave the bus.

Prior art multibus arbiters use timers to allocate the memory bus between the various buses. This is rigid and can lead to an unequitable allocation of memory bus bandwidth between the various peripheral buses.

Therefore, it is desirable to provide a multibus arbiter that allows a dynamic and more equitable allocation of memory bus bandwidth between the various buses.

It is specifically desirable to provide a multibus arbiter that allows a dynamic and more equitable allocation of memory bus bandwidth between the PCI bus and the MCA bus.

SUMMARY OF THE INVENTION

According to the present invention, a multibus arbiter is provided for arbitrating between first and second peripheral bus arbiters for control of a memory bus arbiter. The multibus arbiter comprises: a writable assignment register, a time slot pointer, and an arbitration circuit.

The writable assignment register is in circuit communication with the CPU and stores a multibit time slot assignment value responsive to the CPU, thereby allowing the CPU to allocate accesses between the buses. The time slot pointer has one position for each bit of the writable assignment register and is configured to select at least one of the positions and to select a different position at least partially responsive to both of the peripheral bus arbiters requesting access to the memory bus. The time slot assignment bits can be used to dynamically divide the access to the memory bus between the two peripheral buses.

The individual accesses of the peripheral buses are not directly governed by priority. Rather, the assignment value is determined by the relative priority of the activity of that particular bus at that particular time. Therefore, the access ratio (the ratio of the number of memory bus accesses by each peripheral bus) and, therefore, the access time ratio (the ratio of time each bus spends accessing the memory bus) is determined by the relative priority of the activity of that particular bus at that particular time. Once the assignment value is written to the assignment register, the bus to be granted access during contention is slavishly determined by the time slot pointer and the assignment value associated with each time slot.

For example, if the assignment register and time slot pointer are each eight-bits long, with one bit per position, and if a logical ONE corresponds to the first peripheral bus and a logical ZERO corresponds to the second peripheral bus, then writing a $11101110_2$ to the assignment register allows three accesses of the first peripheral bus for every one access by the second peripheral bus. In one embodiment having a PCI bus and a MCA bus, using $11101110_2$ as the assignment value causes the PCI bus masters to be granted 75% of the accesses and the MCA bus masters to be granted 25% of the accesses, which is a 3:1 access ratio in favor of the PCI bus. Essentially, during contention for the memory bus, the PCI bus is allowed three consecutive accesses before the MCA bus is allowed to access the memory bus.

With an eight-bit time slot pointer and assignment register, the lowest percentage of access would be 12.5% by writing, e.g., $10000000_2$ or $01111111_2$ to the assignment register. The CPU allocates accesses between the various buses. The granularity of access control can be increased by increasing the number of bits in the assignment register and the time slot pointer. A sixteen-bit assignment register and time slot pointer allow a granularity of 6.25% of the accesses. Moreover, preferably the assignment value in the assignment register can be changed dynamically by the CPU, thereby allowing different ratios of accesses depending on specific conditions within the system. In the alternative, the assignment value can be a fixed value incapable of being changed by the CPU.

The multibus arbiter is particularly useful for arbitrating accesses between a PCI bus and an MCA bus. Assuming that a logical ONE in the assignment register indicates that a PCI bus master may access the memory bus and a logical ZERO indicates that an MCA bus master may access the memory bus, and further assuming that, on average, a PCI bus master retains control for an average of 1.5 μs and an MCA bus master retains control of the memory bus an average of 5 μs, then the actual time each bus spends on the bus is approximately equal. That is, the PCI bus masters are granted control of the memory bus for 9 μs (6×1.5 μs) and the MCA bus masters are granted control for 10 μs (2×5 μs), on average. Thus, in this example, the access time ratio is nearly 1:1.

Significantly, the assignment value can be altered dynamically by the CPU thereby changing the ratio of accesses by each peripheral bus. This is useful for tailoring the accesses to the memory bus depending on one or more parameters of the peripheral buses.

It is therefore an advantage of the present invention to provide a multibus arbiter that allows a dynamic and more equitable allocation of memory bus bandwidth between the various buses.

It is a further advantage of this invention to provide a multibus arbiter that allows a dynamic and more equitable allocation of memory bus bandwidth between the PCI bus and the MCA bus.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to example the principles of this invention.

FIGS. 9–11 are timing diagrams showing various timing and causal relationships between the various signals of the embodiment of the multibus arbiter of the present invention shown in FIGS. 7 and 8.

DETAILED DESCRIPTION OF THE PREFERRED EMBODIMENT

Figure 1:
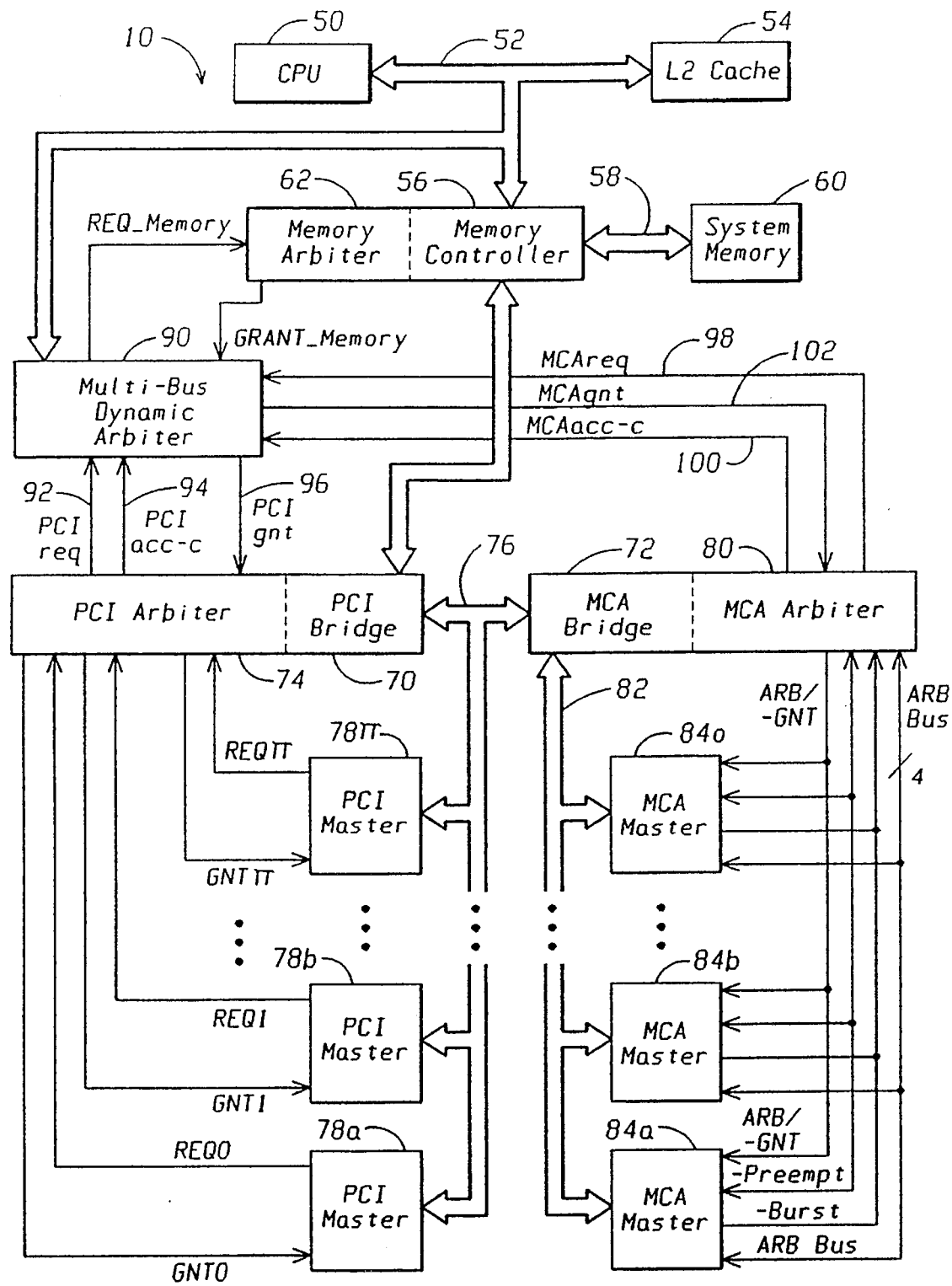
FIG. 1 is a block diagram showing an overall system view of a computer system using a multibus arbiter of the present invention.

Referring now to the drawings, and specifically to FIG. 1, a computer system using the multibus arbiter of the present invention is shown. The computer system 10 includes a CPU 50 having a host processor bus 52 associated therewith. The host processor bus 52 has a data bus, an address bus, and a control bus (all not shown) as known to those skilled in the art. Many possible processors can be used to implement the CPU 50. One suitable processor is the well known 80486DX, which is manufactured by Intel Corp. and Advanced Micro Devices, Inc. In circuit communication with the CPU 50 via the host bus 52 are a level 2 (L2) cache memory 54 and a memory controller 56. The L2 cache 54 is a relatively small bank of memory dedicated to the CPU 50, as should be known to those skilled in the art.

Associated with the memory controller 56 is a memory bus 58. A system memory 60 is in circuit communication with the memory controller 56 via the memory bus 58, as should be known to those skilled in the art. A suitable memory for use in the system memory 60 include the common single in-line memory modules (SIMMs). The memory controller 56 has a memory arbiter 62 associated therewith. The memory arbiter 62 arbitrates use of the system memory 60 between the CPU 50 and the other devices, to be discussed below. The memory arbiter is a simple arbiter using a memory access request line REQ_

MEMORY and a memory access grant line GRANT_MEMORY, as known to those skilled in the art.

The embodiment of FIG. 1 has two peripheral buses: a PCI bus 76 and an MCA bus 82. However, it is to be understood that this invention encompasses other combinations of two or more dissimilar buses or two or more separate buses using the same protocol, such as two or more separate PCI buses, two or more separate MCA buses, etc.

Additionally, the multibus dynamic arbiter of the present invention encompasses other combinations of buses other than one or more peripheral buses contending for access to a memory bus. For example, in a system with three separate peripheral buses, e.g., three PCI buses, the multibus dynamic arbiter can be used to arbitrate accesses to one of the peripheral buses between the other two peripheral buses. Many combinations are possible, e,g., arbitration between synchronous and asynchronous buses, master and slave buses, memory buses and peripheral buses, host buses and peripheral buses, etc.

Referring back to FIG. 1, the system 10 has a PCI bus controller 70 and an MCA bus controller 72, as are known in the art. The PCI bus controller 70 has associated with it a PCI arbiter 74 and the PCI bus 76. The PCI arbiter 74 arbitrates control of the PCI bus 76 among various PCI bus masters 78a–78n using dedicated REQ and GNT lines, as known to those skilled in the art. A description of a circuit including the CPU 50, L2 cache 54, memory controller 56, system memory 60, and PCI bus controller 70 can be found in various publications, e.g., 82420 *PCIset Universal Motherboard Design Guide*, which is available from Intel Corporation Literature, P.O Box 7641, Mt. Prospect, Ill. 60056-7641.

The MCA bus controller 72 has associated with it an MCA arbiters 80 and the MCA bus 82, which the MCA bus controller interfaces from the PCI bus 76. The MCA arbiter arbitrates control of the MCA bus 82 among various MCA bus masters 84a–84σ using ARB/-GNT, -Preempt, -Burst, and the four-bit arbitration bus, as is known to those skilled in the art. The MCA bus is fully described in, e.g., *IBM Personal System/2 Hardware Interface Technical Reference*, which is available to the public from International Business Machines Corporation, the assignee of the present invention.

Arbitrating between the PCI bus arbiter 74 and the MCA bus arbiter 80 is a multibus arbiter 90 of the present invention. The PCI bus arbiter 74 must be designed to provide two signals to the multibus arbiter 90: a PCI request (PCIreq) line 92 and a PCI access-complete (PCIacc-c) line 94. The PCIreq line is used to indicate that the PCI bus 76 requests access to the memory 60 via the memory bus 58. The PCIacc-c line is used to indicate that the current access of the memory 60 by the PCI bus 76 is complete. The PCI arbiter 74 is granted use of the memory bus 58 by a PCI grant (PCIgnt) line 96, which is generated by the multibus arbiter 90. Likewise, the MCA bus arbiter 80 must be designed to provide two signals to the multibus arbiter 90: the MCA request (MCAreq) line 98 and the MCA access-complete (MCAacc-c) line 100. The MCA arbiter 80 is granted use of the memory bus 58 by the MCA grant (MCAgnt) line 102, which is generated by the multibus arbiter 90. An ACC-C line is used to indicate that either of the peripheral buses has completed an access to the memory 60 via the memory bus 58 and is generated by the logical ORing of the PCIacc-c signal and the MCAacc-c signal. It is believed that the request and grant lines for both buses either exist for each peripheral bus arbiter or can easily be generated using the given signals by those skilled in the art.

In the present embodiment, the memory arbiter 62, the PCI bus arbiter 74, the MCA bus arbiter 80, and the multibus arbiter 90 are separate, thereby forming a distributed arbitration system. In the alternative, as is apparent to those skilled in the art, one or more of the arbiters 62, 74, 80, and 90 can be integrated into a central arbiter, thereby forming a more centralized arbitration system. That is, one or more or the arbiters 62, 74, 80, and 90 can be integrated into a single system arbiter, while maintaining the structure and functionality described herein.

Figure 2A:
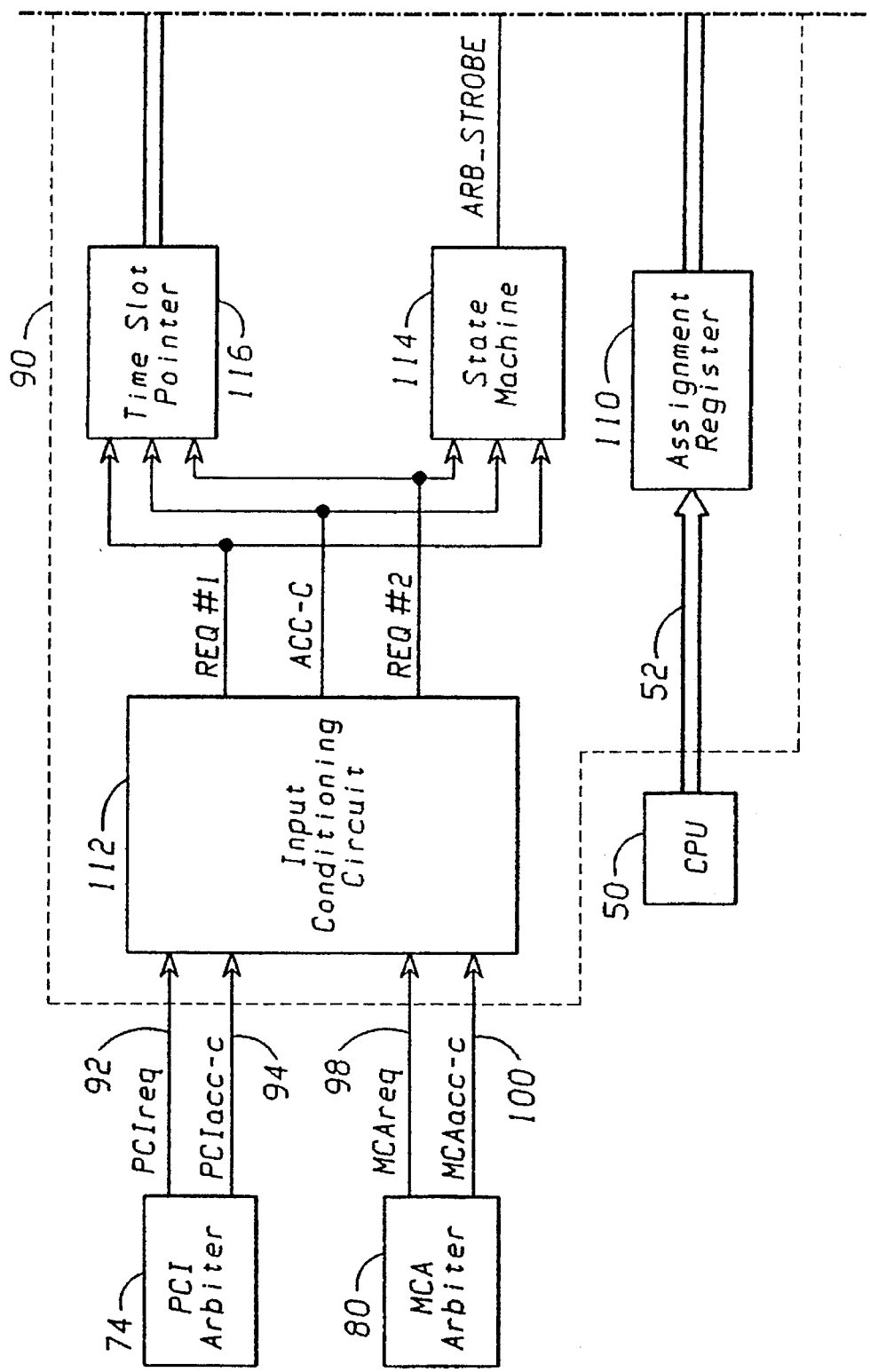
FIGS. 2A and 2B are block diagrams showing certain internal portions of the multibus arbiter of the present invention.
Figure 2B:
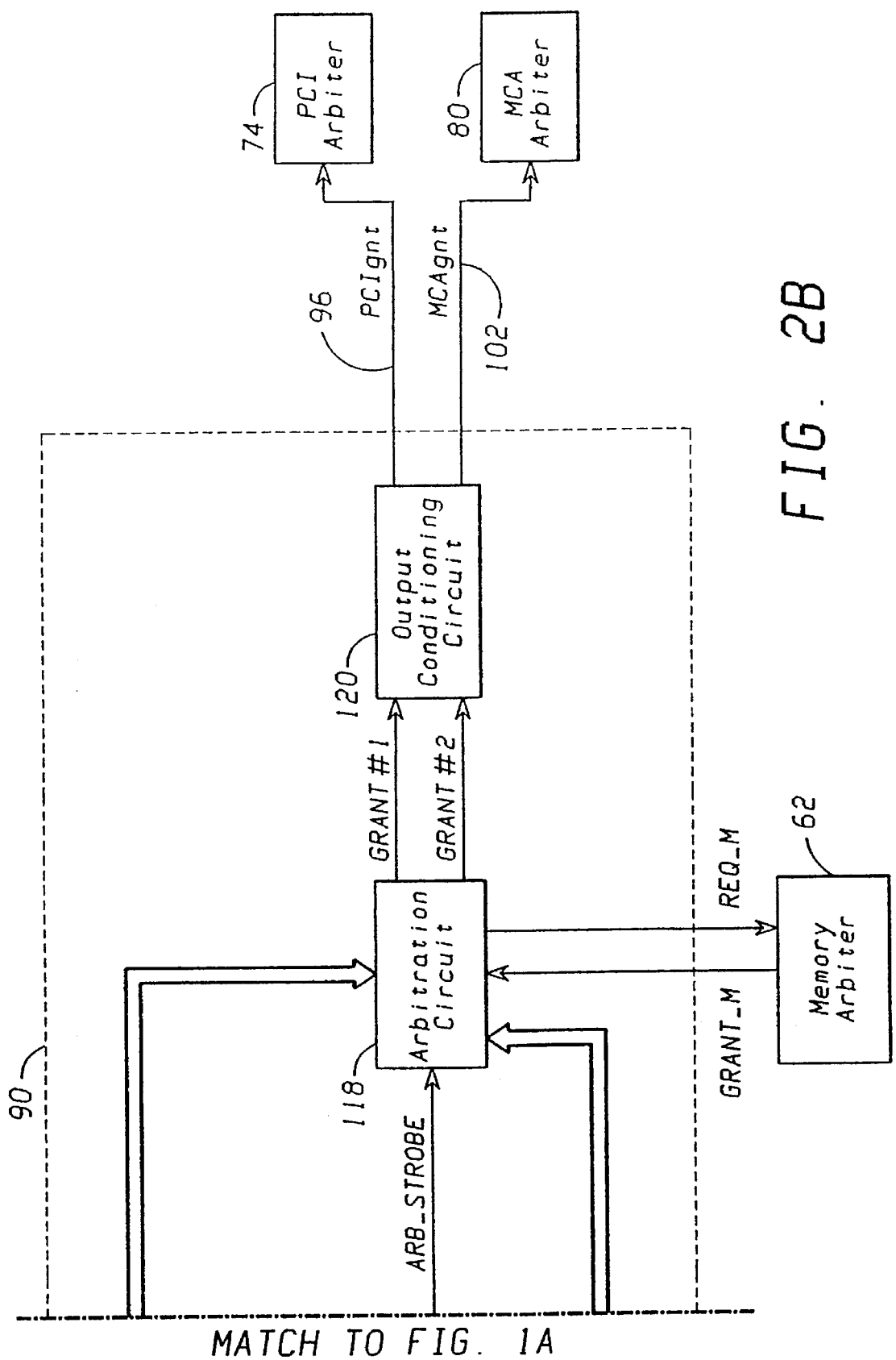

Referring now to FIGS. 2A and 2B, a block diagram showing the internal components of the multibus arbiter 90 of the present invention are shown. The arbiter 90 comprises an assignment register 110, an input conditioning circuit 112, an arbitration strobe state machine 114, a time slot pointer 116, an arbitration circuit 118, and an output conditioning circuit 120, all in circuit communication as shown in those figures.

The assignment register 110 is in circuit communication with both the host bus 51 of the CPU 50 and the arbitration circuit 118.

The input conditioning circuit 112 is in circuit communication with the PCI arbiter 74, the MCA arbiter 80, the time slot pointer 116, and the state machine 114 and conditions the inputs for use with the time slot pointer 116 and the state machine 114. For example, the time slot pointer 116 and state machine 114 expect synchronous signals. In addition, the ACC-C signal is expected to be one clock cycle in length to function properly with the state machine 114. Therefore, the input conditioning circuit is responsible for making asynchronous signals synchronous and ensuring that the ACC-C pulses are one cycle in length. Thus, the specific circuitry 112 will depend on the specific buses being dynamically arbitrated.

As will be more fully explained below, in one particular embodiment, the conditioning circuit 112 (1) accepts the synchronous PCIreq (PCI bus master request) signal from the PCI arbiter 74 and generates a synchronous REQ#1 signal, (2) accepts the asynchronous MCAreq (MCA bus master request) signal from the MCA arbiter 80 and generates a synchronous REQ#2 signal, and (3) accepts both the synchronous PCIacc-c (PCI bus master access complete) signal and the asynchronous MCAacc-C (MCA bus master access complete) signals from the PCI arbiter 74 and the MCA arbiter 80, respectively, and generates a single ACC-C (access complete) signal, which is a signal synchronous with the clock and which is one clock cycle long.

The state machine 114 accepts the REQ#1, REQ#2, and ACC-C signals from the input conditioning circuit 112 and generates ARB_STROBE (arbitration strobe) signal, which is used by the arbitration circuit 118.

The time slot pointer 116 is in circuit communication with the arbitration circuit 118 and the input conditioning circuitry 112. The time slot pointer 116 accepts the REQ#1, REQ#2, and ACC-C signals from the input conditioning circuit 112 and transmits an n-bit number to the arbitration circuit 118.

The arbitration circuit 118 is in circuit communication with the assignment register 110, the state machine 114, the time slot pointer 116, the memory arbiter 62, and the output conditioning circuit 120. The arbitration circuit 118 accepts as inputs the n-bit value from the assignment register 110, the n-bit value from the time slot pointer 116, the ARB_STROBE from the state machine 114, and the GRANT_MEMORY (memory bus access granted) signal from the memory arbiter 62 and generates a REQ_MEMORY (request memory bus access) signal to the memory arbiter 62 and GRANT#1 and GRANT#2 signals to the output conditioning circuit 120.

The output conditioning circuit 120 is in circuit communication with the arbitration circuit 118, the PCI arbiter 74 and the MCA arbiter 80. As with the input conditioning circuit 112, the output conditioning circuit conditions the synchronous signals from inside the multibus arbiter 90 to meet requirements of signals outside the arbiter 90. Specifically, the output conditioning circuit 120 generates PCIgnt (PCI bus granted control of the memory bus) signal and the MCAgnt (MCA bus granted control of the memory bus) signal from the GRANT#1 and GRANT#2 signals, respectively.

Figure 3:
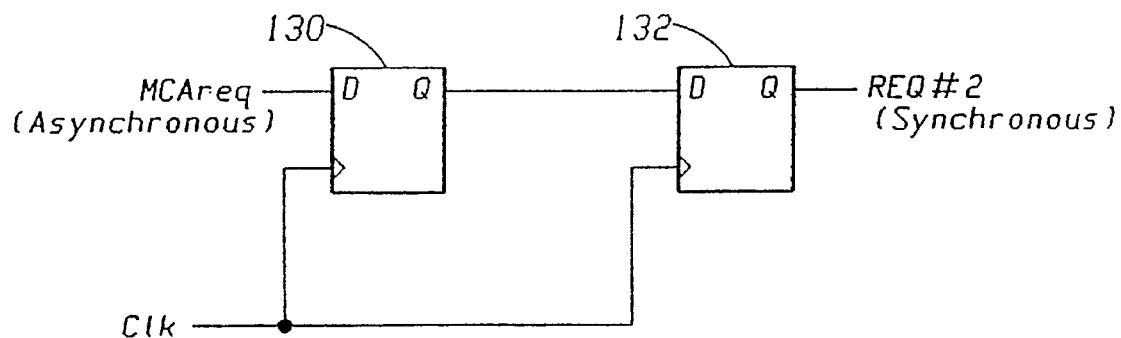
FIGS. 3–5 are electrical schematic diagrams of the conditioning circuitry used to convert the PCI bus and MCA bus signals into signals suitable for the other circuitry.
Figure 4:
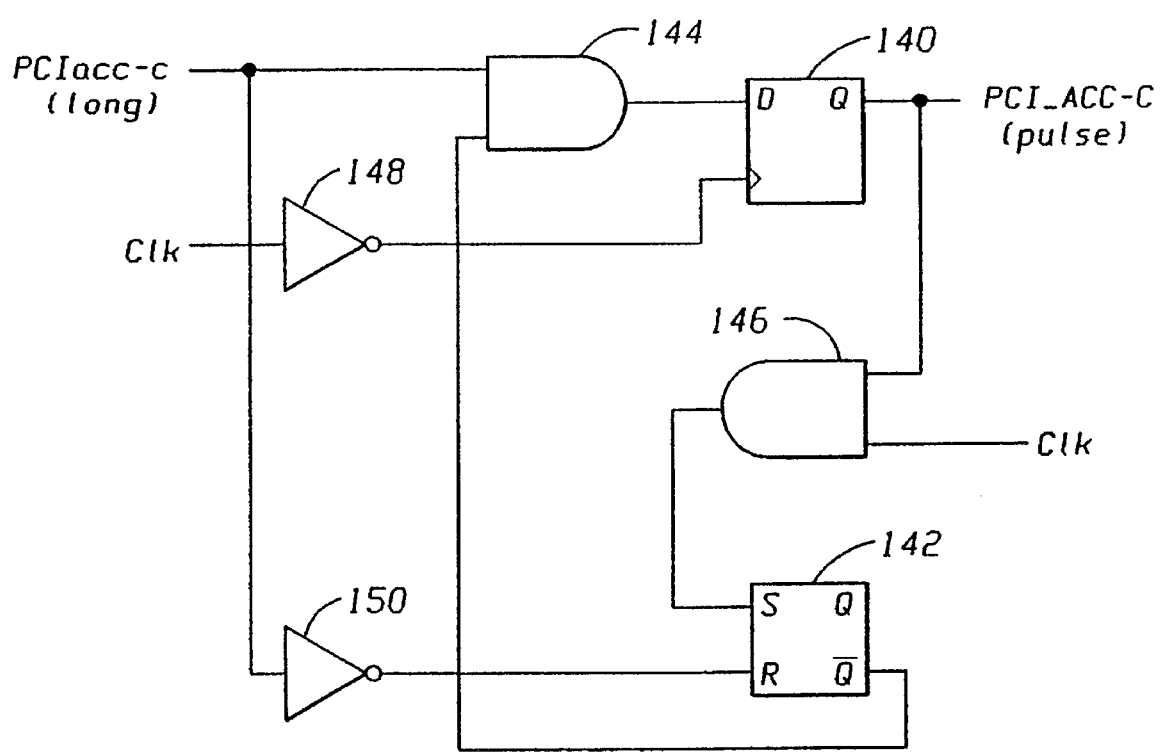
Figure 5:
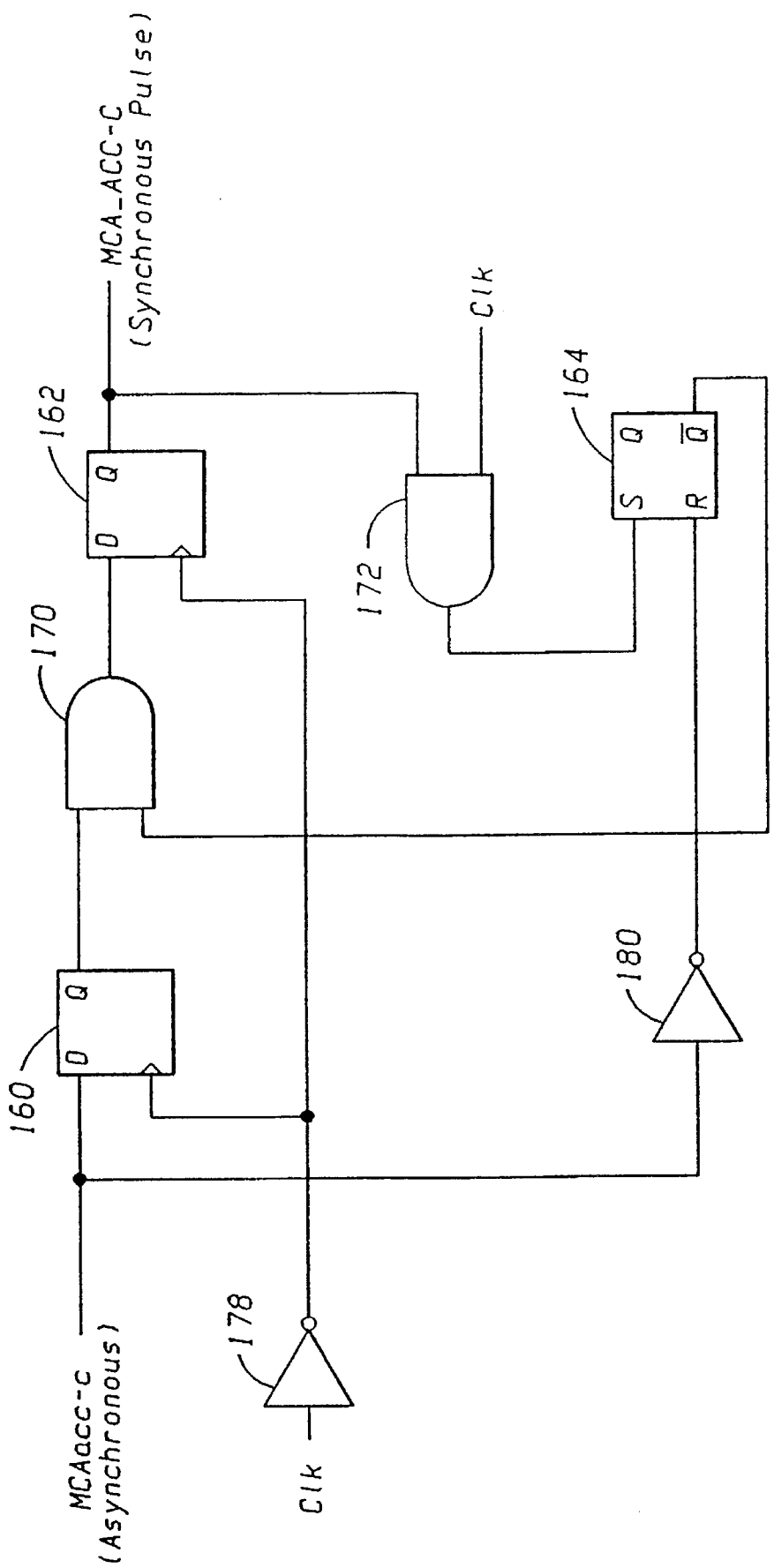

Referring now to FIGS. 3–5, the circuitry of one embodiment of the input conditioning circuitry 112 is shown. As mentioned above, the specific circuitry needed will depend entirely on the nature of the two buses being arbitrated. In this particular embodiment, the two buses are the PCI bus 76 and the MCA bus 82. The PCIreq signal is already synchronous with the system clock, therefore, no input conditioning is necessary and the REQ#1 signal is the PCIreq signal. At most, the logical level of the PCIreq signal might need to be inverted to generate the REQ#1 signal. In the alternative, if the PCI bus clock is different from the CPU clock, then a circuit similar to the circuit described in the text accompanying FIG. 3 might be needed to make the REQ#1 signal synchronous with the CPU clock.

On the other hand, the MCAreq signal is asynchronous and must be conditioned by the input conditioning circuit 112 to generate the synchronous REQ#2 signal. Circuitry to perform this conditioning is shown in FIG. 3. In that figure two clocked D flip-flops 130, 132 are in circuit communication as shown in that figure. When the system is powered on, and when the system power on reset (POR) signal is asserted, as is known to those skilled in the art, both D flip-flops 130, 132 are reset with their respective Q outputs set to a logical ZERO. When the asynchronous MCAreq signal transitions from a logical ZERO to a logical ONE, the first D flip-flop 130 is SET and its Q output becomes a logical ONE responsive to the next rising edge of the clock signal (CLK). At the next rising edge of the clock signal (CLK), the second D flip-flop 132 is SET by the first D flip-flop 130 and its Q output becomes a logical ONE synchronously with the clock signal (several delays later). The Q signal from the second D flip-flop 132 is the REQ#2 signal.

The two D flip-flops 130, 132 remain SET until the MCAreq signal transitions from a logical ONE to a logical ZERO. Thereafter, responsive to the next rising edge of the clock signal, the first D flip-flop 130 is RESET to a logical ZERO. Responsive to the next rising edge of the clock signal, the second D flip-flop 132 is RESET to a logical ZERO by the first D flip-flop 130. Consequently, the REQ#2 signal becomes a logical ZERO synchronously with the clock signal (several gate delays later). Thus, the asynchronous MCAreq signal is conditioned to be the synchronous REQ#2 signal. Note that the REQ#2 signal remains a logical ONE continuously if the MCAreq signal remains a logical ONE.

Referring now to FIG. 4, the circuitry used to condition the PCIacc-c signal is shown. The PCIacc-c signal is synchronous with the clock signal but is longer than one clock cycle in length. The FIG. 4 circuit shortens the PCIacc-c signal into a single clock cycle in length. As shown in that figure, a D flip-flop 140 and an R-S latch 142 are in circuit communication with two two-input AND gates 144, 146 and two inverters 148, 150. When the system is powered up, and when the system POR signal is asserted, the D flip-flop 140 and the R-S latch 142 are RESET; therefore, their respective Q outputs are logical ZERO. After the PCIacc-c signal becomes a logical ONE, the D flip-flop 140 is SET via the AND gate 144 responsive to the next rising edge of the inverted clock signal (the next falling edge of the clock signal) and its Q output becomes a logical ONE synchronously with the clock signal (several delays later). The Q signal from the D flip-flop 140 is the PCI_ACC-C signal.

As the clock signal rises, the R-S latch 142 is SET by the second AND gate 146 and its Q output becomes a logical ONE synchronously with the clock signal (several delays later). The $\overline{Q}$ signal from the R-S latch 142 is fed back to the first AND gate 144. As such, on the next rising edge of the inverted clock signal (next falling edge of the clock signal), the D flip-flop is RESET and its Q output and the PCI_ACC-C signal become a logical ZERO. After the PCIacc-c signal falls from a logical ONE back to a logical ZERO, the R-S latch 142 is reset and the cycle begins again.

Therefore, the synchronous PCIacc-c signal of various lengths has been conditioned to be the synchronous PCI_ACC-C signal, which is one clock cycle in length. As will be apparent to those skilled in the art, the state machine 114 can be made so as not to require the various signals to be one clock pulse in length. However, doing so facilitates and simplifies the design of the state machine 114.

Referring now to FIG. 5, the circuitry used to condition asynchronous signals of various lengths to synchronous signals one clock cycle long is shown. Specifically, the circuit of FIG. 5 conditions the asynchronous MCAacc-c signal to a synchronous MCA_ACC-C signal that is one clock cycle long. As shown in that figure, two D flip-flops 160, 162 and an R-S latch 164 are in circuit communication with two two-input AND gates 170, 172 and two inverters 178, 180. When the system is powered up, and when the system POR signal is asserted, the D flip-flops 160, 162 and the R-S latch 164 are RESET; therefore, their respective Q outputs are logical ZERO. After the MCAacc-c signal becomes a logical ONE, the first D flip-flop 160 is SET responsive to the next rising edge of the inverted clock signal (the next falling edge of the clock signal) and its Q output becomes a logical ONE synchronously with the clock signal (several delays later). On the next rising edge of the inverted clock signal (the next falling edge of the clock signal) the second D flip-flop 162 is SET via the AND gate 170 responsive to that edge and its Q output becomes a logical ONE synchronously with the clock signal (several delays later). The Q signal from the second D flip-flop 162 is the MCA_ACC-C signal.

Thereafter, as the clock signal rises, the R-S latch 164 is SET by the second AND gate 172 and its Q output becomes a logical ONE synchronously with the clock signal (several delays later). The $\overline{Q}$ signal from the R-S latch 142 is fed back to the first AND gate 144. As such, on the next rising edge of the inverted clock signal (next falling edge of the clock signal), the second D flip-flop 162 is RESET and its Q output and the MCA_ACC-C signal become a logical ZERO. After the MCAacc-c signal falls from a logical ONE back to a logical ZERO, the R-S latch 142 is reset and the cycle begins again.

Therefore, the asynchronous MCAacc-c signal of various lengths has been conditioned to be the synchronous MCA_ACC-C signal, which is one clock cycle in length. The MCA_ACC-C signal and the PCI_ACC-C signal are ORed by an OR gate (not shown) to form the ACC-C signal, which is used by various other circuitry in the multibus arbiter 90.

Figure 6:
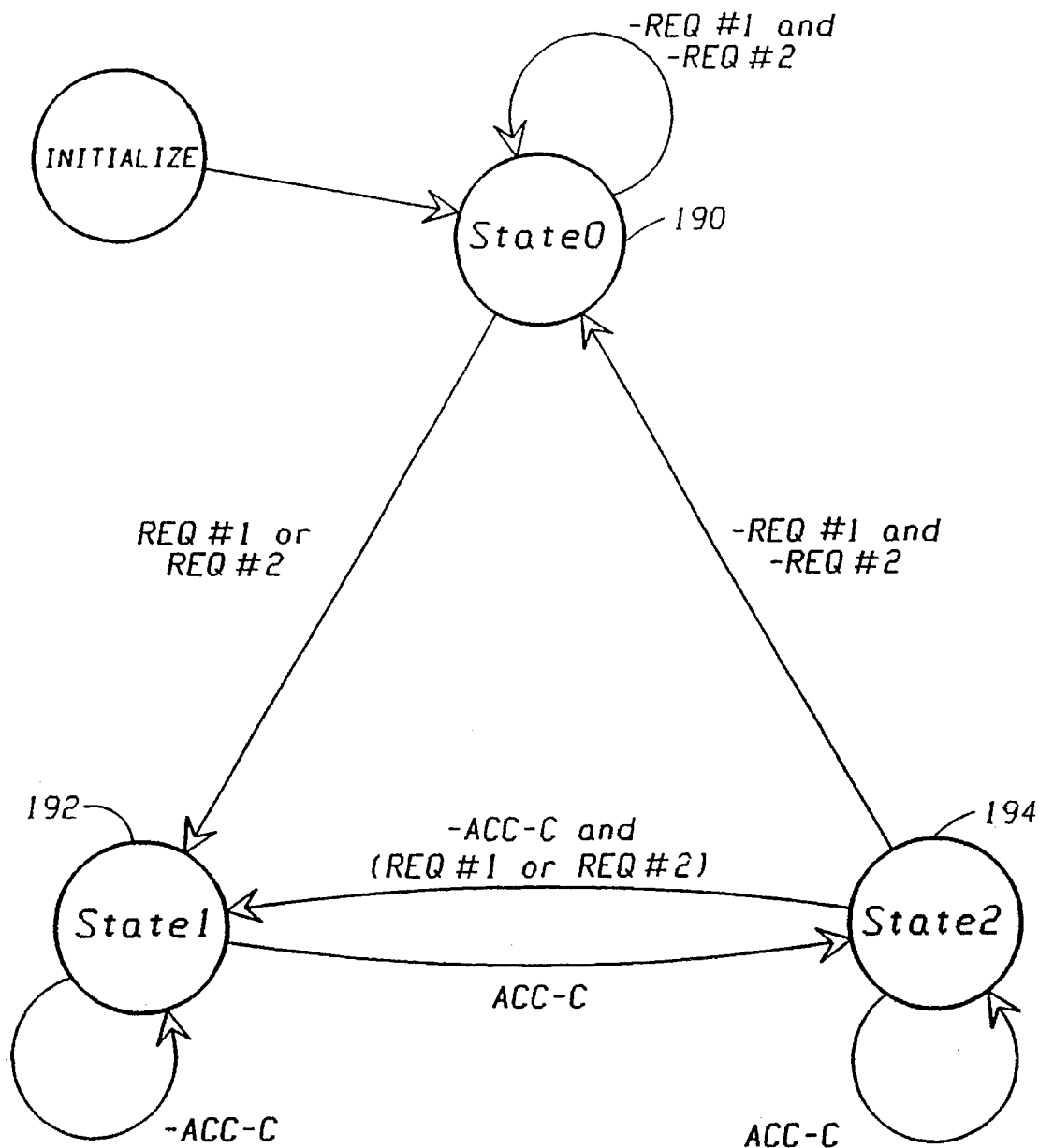
FIG. 6 is a state machine diagram showing the state transitions used to generate the ARB_STROBE signal.

Referring now to FIG. 6, the state machine 114 governing the generation of the ARB_STROBE signal is shown. In that figure, three states—State0 190, State1 192, and State2 192—are controlled by the REQ#1, REQ#2, and ACC-C signals. The state machine is initialized into State0 190. State1 192 is entered from either State0 190 or State2 194 responsive to either REQ#1 or REQ#2 being asserted (logical ONE). State2 194 is entered from State1 192 responsive to the ACC-C signal being asserted (logical ONE). The ARB_STROBE signal is asserted (logical ONE) for one clock cycle responsive to changing from any one of the three states to any of the other two states. Those skilled in the art can produce a suitable circuit using the state diagram shown in FIG. 6, the specification, and the other figures using any of several methods, including using a Karnaugh map.

Figure 7:
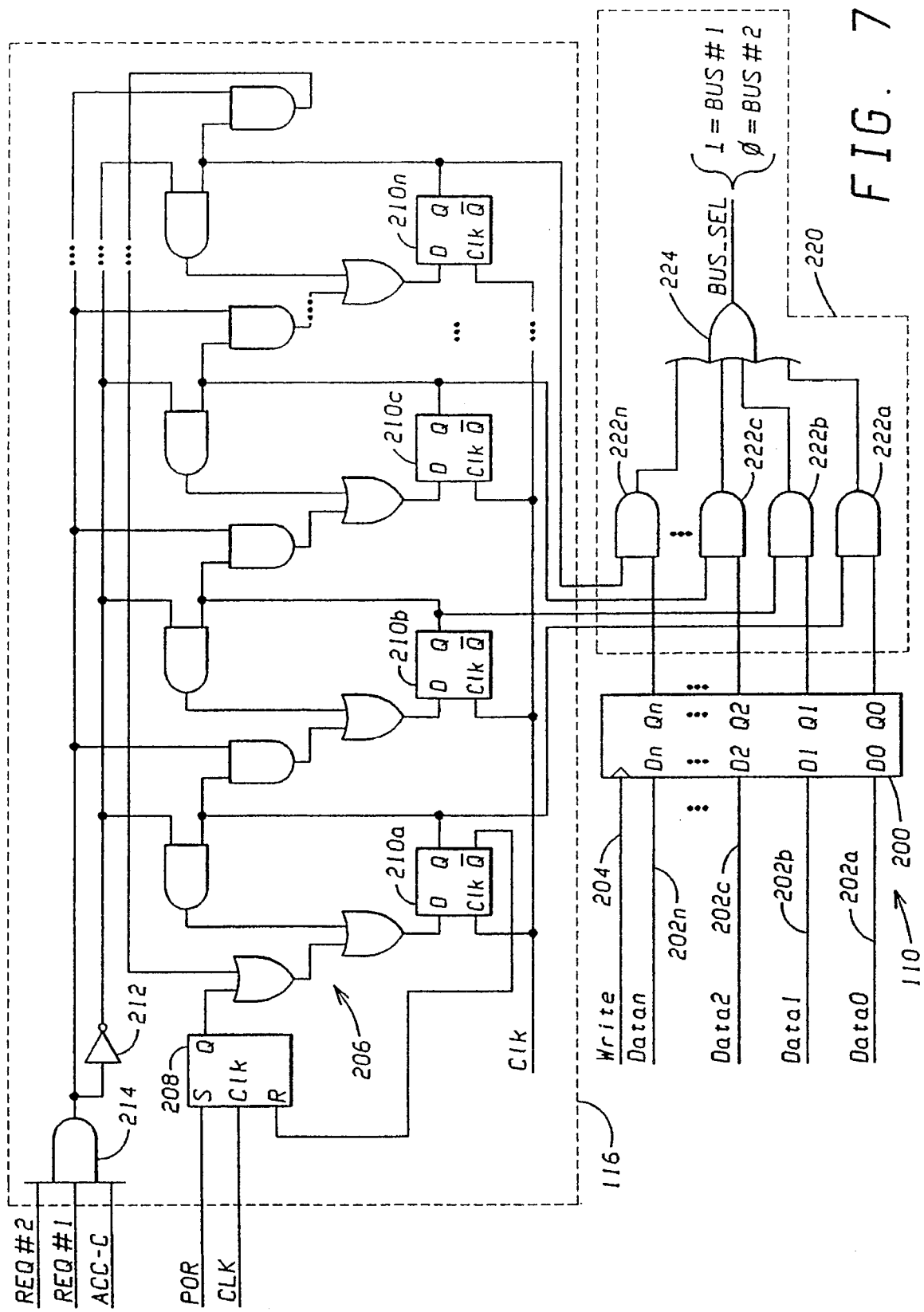
FIGS. 7 and 8 are electrical schematic diagrams of the circuitry of an embodiment of the multibus arbiter of the present invention.
Figure 8:
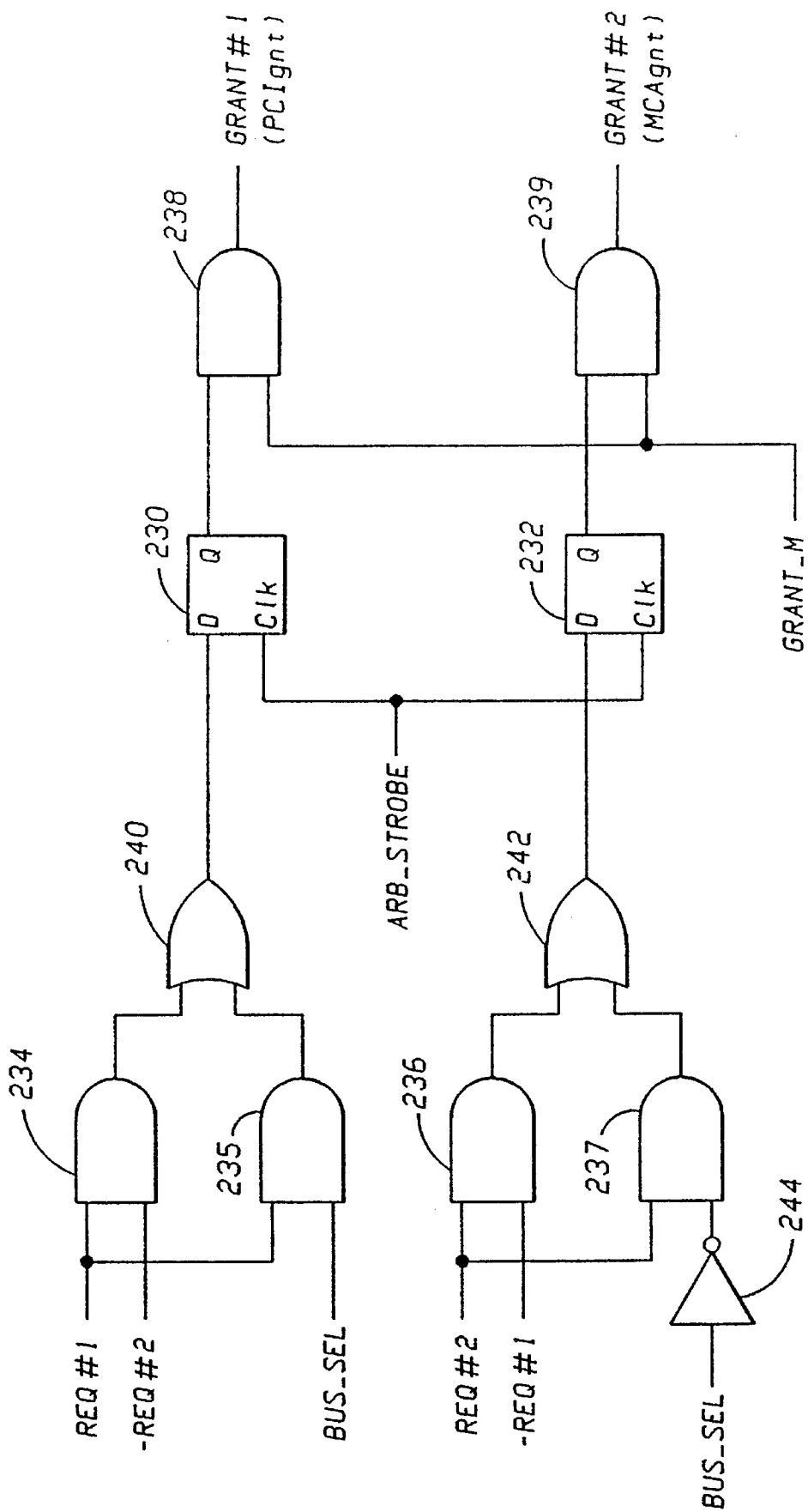

Referring now to FIGS. 7 and 8, the circuitry for the assignment register 110, the state machine 114, the time slot pointer 116, and the arbitration circuit 118 are shown.

The CPU 50 allocates accesses between the various buses. The assignment register 110 holds a multiposition time slot assignment value written by the CPU 50. Each position corresponds to a particular time slot and gives the identity of the bus that has been allocated that particular time slot. Preferably each position is one bit in length and can, therefore, distinguish between the two peripheral buses. For example, if the assignment register 110 and time slot pointer 116 are each eight-bits long, and if a logical ONE corresponds to the first peripheral bus and a logical ZERO corresponds to the second peripheral bus, then writing a $11101110_2$ to the assignment register allows three successive accesses of the first peripheral bus for every one access by the second peripheral bus (when there is contention between the two buses for the memory bus 58).

In the embodiment using the PCI bus 76 and the MCA bus 82, assuming a ONE corresponds to the PCI bus being assigned to that time slot and a ZERO corresponding to the MCA bus being assigned to that time slot, PCI bus masters are granted 75% of the accesses and the MCA bus masters are granted 25% of the accesses.

With eight bits, the lowest percentage of access would be 12.5% by writing, e.g., $10000000_2$ or $01111111_2$ to the assignment register 110. The granularity of access control can be increased by increasing the number of bits in the assignment register 110 and the time slot pointer 116. A sixteen-bit assignment register 110 and time slot pointer 116 allow a granularity of 6.25% of the accesses. Moreover, the assignment value in the assignment register 110 can be changed dynamically by the CPU 50, thereby allowing different ratios of accesses depending on specific conditions within the system.

As shown in FIG. 7, the assignment register 110 can be an n-bit writable register 200, such as the standard TTL designated device 74273 or in its equivalent (if an 8-bit register is desired) in a programmable logic device (PLD), a field programmable logic array (FPLA), an application specific integrated circuit (ASIC), etc. In fact, the circuitry for the multibus arbiter 90 shown in the figures can be reproduced in a programmable logic device (PLD), a field programmable logic array (FPLA), an application specific integrated circuit (ASIC), etc. of a suitable size. The data lines 202a–202n of the register 200 are connected to the data bus (not shown) of the CPU 50 and the write line 204 is generated by decoding one or more address and control lines (not shown) of the CPU 50 in such a manner that data may be written from the CPU 50 and latched into the assignment register 200, as is known by those skilled in the art. At power-up, the n bits in the register 200 are a logical ZERO. These values are changed by writing values with the CPU 50.

Preferably, the assignment register 110 holds an assignment value responsive to writes by the CPU 50. In the alternative, the assignment register can be a device that holds a fixed predetermined assignment value. For example, the writable register 200 can be replaced by eight pull-up and pull-down resistors generating a predetermined fixed value, e.g., $11101110_2$. Such a value would not allow dynamic control over the access ratios, but is a useful alternative in certain circumstances.

As mentioned above, the time slot pointer 116 is in circuit communication with the conditioning circuitry 112 and the arbitration circuit 118. An embodiment of the time slot pointer 116 is also shown in FIG. 7. As shown in that figure, the time slot pointer 116 is also in circuit communication with the power on reset (POR) signal and the system clock, both of which are known to those of ordinary skill in the art.

In this particular embodiment, the time slot pointer 116 comprises an R-S flip-flop 208 and n D flip-flops 210a–210n, in circuit communication with an inverter 212, a three-input AND gate 214, and various two-input AND gates and two-input OR gates, as shown in FIG. 7. These devices are in circuit communication to form a self-starting ring counter with one logical ONE that passes the logical ONE from flip-flop to flip-flop responsive to the REQ#1, REQ#2, and ACC-C signals being active (logical ONE). As is apparent to those skilled in the art, the exact number of AND and OR gates will depend on the specific value of n. As stated above, the value of n depends on the particular granularity of accesses desired. As is apparent from the figure, adding another stage involves adding two two-input AND gates, a two-input OR gate, and a D flip-flop per stage.

As will also be apparent to those skilled in the art, the time slot pointer circuitry can be modified to increment the pointer either at the beginning of an access cycle, at the end of a cycle (as in the present invention), or at various points during the access cycle. The critical condition for incrementing the time slot pointer 116 is contention at some point between the first and second peripheral buses. Thus, in the present invention, the time slot pointer value changes at least partially responsive to both peripheral buses requesting access to the memory bus. Particular embodiments may require that other conditions be met before incrementing the time slot pointer. For example, in the embodiment of FIG. 7, the time slot pointer increments only when both peripheral buses are requesting the memory bus and one of the peripheral buses just finished accessing the memory bus and a rising edge of the clock signal occurs. Other embodiments can be made that use other conditions, such as a falling edge of the clock signal or the start of a cycle under contention. The critical aspect is that the time slot pointer value changes at least partially responsive to both peripheral buses requesting access to the memory bus.

Referring back to FIG. 7, at power up, the R-S flip-flop 208 and the n D flip-flops 210a–210n are RESET to a logical ZERO. Responsive to the POR signal, the first D flip-flop 210a is SET to a logical ONE. After that point, the time slot pointer 116 sequentially passes the logical ONE from flip-flop to flip-flop responsive to the REQ#1, REQ#2, and ACC-C signals being active (logical ONE) during a rising edge of the clock. Again, the critical aspect is that the time slot pointer value changes at least partially responsive to both peripheral buses requesting access to the memory bus. In this embodiment, after initialization, at all times, a single logical ONE will be present. For example, in an eight-bit system, the time-slot pointer 116 will start out as $10000000_2$ and, responsive to the REQ#1, REQ#2, and ACC-C signals being active (logical ONE), will sequentially change to $01000000_2$ to $00100000_2$ to $00010000_2$ to $00001000_2$ to $00000100_2$ to $00000010_2$ to $00000001_2$ and back to $10000000_2$. In the alternative, the values can progress as follows: $00000001_2$ to $00000010_2$ to $00000100_2$ to $00001000_2$ to $00010000_2$ to $00100000_2$ to $01000000_2$ to $10000000_2$ and back to $00000001_2$. The specific incrementing and decrementing direction is not critical; what is critical is that the assignment values in the assignment register correspond to the associated stages of the time slot pointer.

In this embodiment, the arbitration circuit 118 consists of the circuitry 220 of FIG. 7 and the circuitry of FIG. 8. The circuit 220 comprises n AND gates 222a–222n and an n-input OR gate 224 and is configured as a one-of-n selector. The value of the BUS_SEL signal is the value of bit of the assignment value in the assignment register 110 that corresponds to the bit of the time slot pointer 116 with the logical ONE. For example, if the assignment register has the value $11101110_2$ stored therein and the time slot pointer is currently $00100000_2$, then the value of the BUS_SEL signal will be a logical ONE, indicating that during the next contended access cycle the first peripheral bus will be given access. In the embodiment using the PCI bus and the MCA bus, the PCI bus will be given access.

Referring now to FIG. 8, the portion of the arbitration circuit 118 used to generate the GRANT#1 and GRANT#2 signals is shown. This circuit has two D flip-flops 230,232 in circuit communication with six two-input AND gates 234, 235, 236, 237, 238, and 239, two two-input OR gates 240, 242, and an inverter as shown in that figure. This circuit functions as follows. Both D flip-flops 230, 232 are initialized to a logical ZERO. When either (1) only the first peripheral bus (PCI bus) is requesting access to the memory bus 58 (the REQ#1 signal is asserted and the REQ#2 signal is not asserted) or (2) the first peripheral bus (PCI bus) is requesting access to the memory bus 58 (the REQ#1 signal is asserted) and the BUS_SEL signal indicates that the first peripheral bus (PCI bus) should be given control of the memory bus 58 (whether REQ#2 is asserted or not), then a logical ONE is stored in the D flip-flop 230 responsive to a rising edge of the ARB_STROBE signal. This latched ONE causes the GRANT#1 line to be asserted (logical ONE) responsive to the GRANT_MEMORY signal indicating that the memory bus 58 can be accessed (logical ONE).

On the other hand, when either (1) only the second peripheral bus (MCA bus) is requesting access to the memory bus 58 (the REQ#2 signal is asserted and the REQ#1 signal is not asserted) or (2) the second peripheral bus (MCA bus) is requesting access to the memory bus 58 (the REQ#2 signal is asserted) and the BUS_SEL signal indicates that the second peripheral bus (MCA bus) should be given control of the memory bus 58 (logical ZERO) (whether REQ#1 is asserted or not), then a logical ONE is stored in the other D flip-flop 232 responsive to a rising edge of the ARB_STROBE signal. This latched ONE causes the GRANT#2 line to be asserted (logical ONE) responsive to the GRANT_MEMORY signal indicating that the memory bus 58 can be accessed (logical ONE).

As generated by the arbitration circuit 118, the GRANT#1 and GRANT#2 signals are held at a logical ONE continuously while the corresponding bus has access to the memory bus 58. For some buses, this configuration might not be compatible with the buses' arbiter. As such, the GRANT signals may need to be conditioned. For example, a bus might need a pulse or a signal that is asynchronous with the system clock. In that case the output conditioning circuit 120 would be configured to condition either or both of the GRANT signals to meet the parameters of the buses. In the embodiment using the PCI bus and the MCA bus, the GRANT#1 and GRANT#2 signals can be used as generated by the arbitration circuit 118. No conditioning is needed; the output conditioning circuit merely passes the GRANT#1 signal to the PCIgnt input of the PCI arbiter 74 and passes the GRANT#2 signal to the MCAgnt signal of the MCA arbiter 80.

Using the multibus arbiter 90 of the present invention is relatively straightforward. An assignment value corresponding to the desired access ratio and the desired access time ratio is written to the assignment register 110 by the CPU 50 or any other device configured to do so. At that point accesses to the memory bus 58 are controlled by the memory controller 56, memory arbiter 62, and the multibus arbiter 90.

Figure 9:
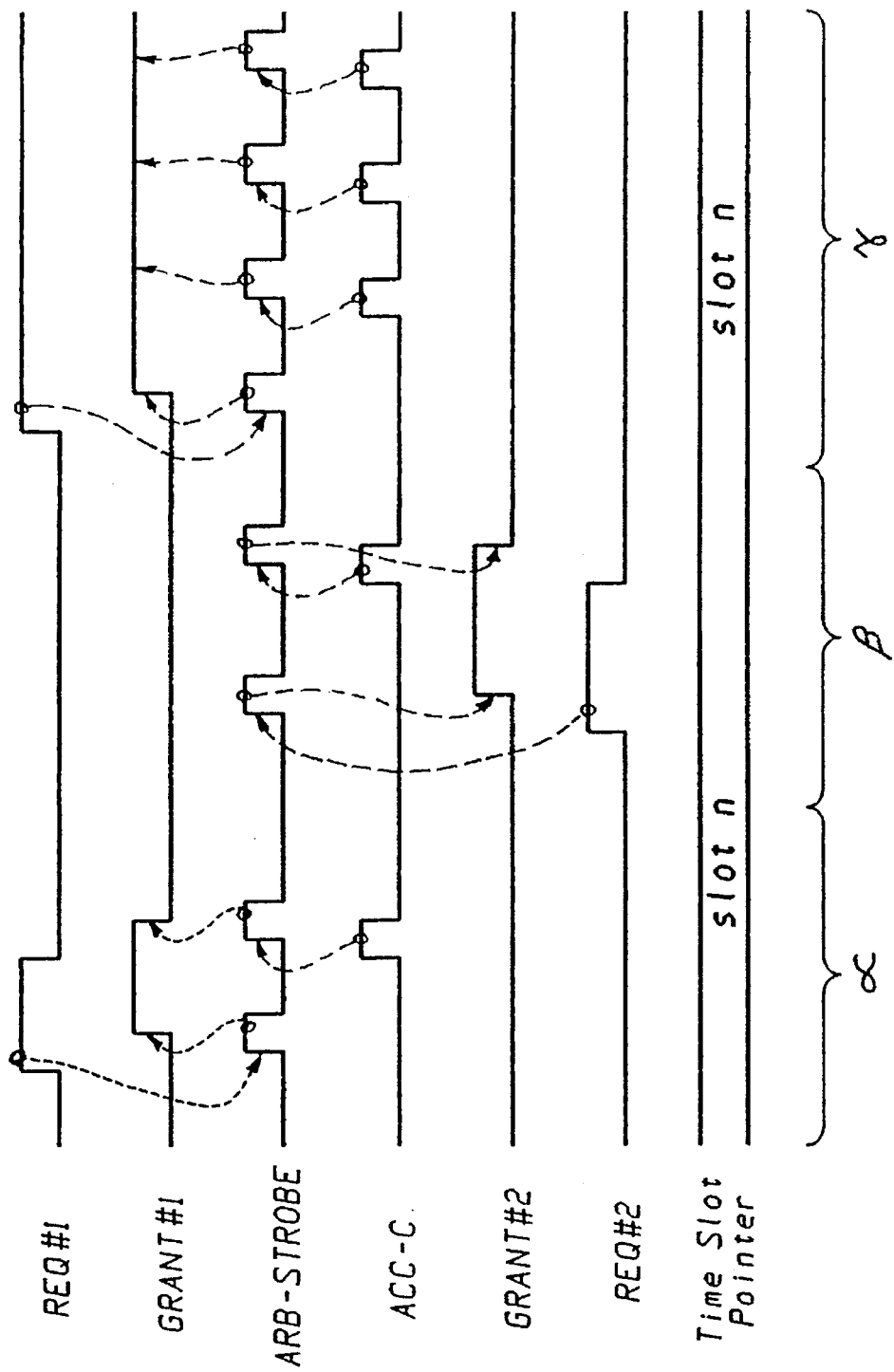

Referring now to FIG. 9, a timing diagram showing the functioning of the arbiter 90 without contention is shown. (The widths of the signals in FIG. 9 are grossly out of scale, with the ARB_STROBE and ACC-C signals expanded to show causal relationships between the signals.) In that figure, only one of the buses requests access to the memory bus 58 at a time. As such, the time slot pointer 116 never shifts.

In the region of time indicated by the symbol "α" the first peripheral bus (PCI bus) is requesting and is granted access to the memory bus 58. Responsive to the REQ#1 signal being active, the ARB_STROBE signal pulses, which causes the GRANT#1 signal to become active. Once the first peripheral bus (PCI bus) is finished with the memory bus 58, the ACC-C signal pulses, which causes the ARB_STROBE signal to pulse, thereby causing the GRANT#1 signal to become inactive.

Similarly, in the region of time indicated by the symbol "β" the second peripheral bus (MCA bus) is requesting and is granted access to the memory bus 58. Responsive to the REQ#2 signal being active, the ARB_STROBE signal pulses, which causes the GRANT#2 signal to become active. Once the second peripheral bus (MCA bus) is finished with the memory bus 58, the ACC-C signal pulses, which causes the ARB_STROBE signal to pulse, thereby causing the GRANT#2 signal to become inactive.

Lastly in FIG. 9, in the region of time indicated by the symbol "γ" the first peripheral bus (PCI bus) is continuously requesting and is granted continual access to the memory bus 58. Responsive to the REQ#1 signal being active, the ARB_STROBE signal pulses, which causes the GRANT#1 signal to become active. Each time the first peripheral bus (PCI bus) is finished with the memory bus 58, the ACC-C signal pulses, which causes the ARB_STROBE signal to pulse. However, unlike the situation α above, the GRANT#1 is continuously regenerated by the ARB_STROBE signal.

Again, throughout the time period of the timing diagram of FIG. 9, the time slot pointer remained pointing to time slot n.

Figure 10A:
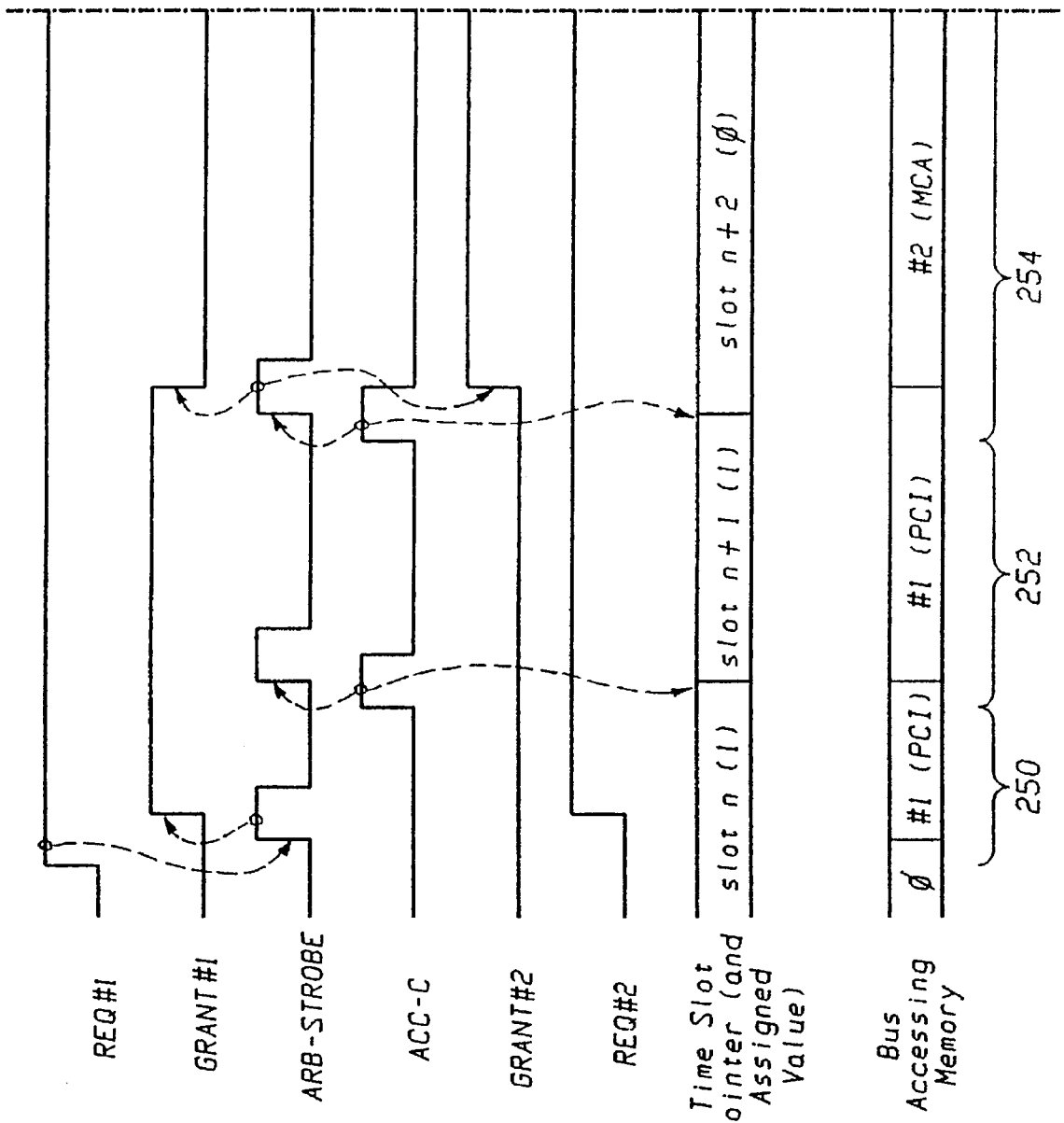

Referring now to FIGS. 10A and 10B, a timing diagram showing contention for the memory bus 58 is shown. (Like the timing diagram of FIG. 9, FIGS. 10A and 10B are out of scale, with the ARB STROBE and ACC-C signals expanded to show causal relationships between the signals.) The time slot pointer is shown pointing to slots n, n+1, n+2, etc. In this particular example, slots n through n+6 correspond to an assignment value of . . . $1101110_2$. . . . That is, slot n corresponds to an assignment value of ONE, slot n+1 to an assignment value of ONE, slot n+2 to ZERO, slot n+3 to ONE, slot n+4 to ONE, slot n+5 to ONE, and slot n+6 to ZERO.

As shown in those figures, in the period of time indicated at 250, the PCI arbiter 74 requests the bus with the PCIreq signal, which is the REQ#1 signal. Since the MCA bus arbiter 80 is not requesting access to the memory bus 58, the PCI bus arbiter 74 is granted access to the memory bus 58 in a manner identical to that of FIG. 9.

Soon thereafter, the MCA arbiter 80 requests access to the memory bus with the MCAreq signal, which is conditioned by the input conditioning circuit 112 to be the REQ#2 signal, as explained above. During the time period indicated at 252, since there is now contention between the two bus arbiters 74, 80 for the memory bus 58, the time slot pointer 116 will increment when the PCI arbiter 74 signals that it has finished accessing the memory bus 58 by asserting the PCIacc-c signal, which is conditioned by the input conditioning circuit 112 to assert the ACC-C signal.

Since there is contention between the two arbiters 74, 80, slot n+1 and the associated assignment value determine which peripheral bus arbiter will access the memory bus 58. As shown in the period of time indicated at 250, since the assignment value associated with slot n is a logical ONE, the PCI bus arbiter 74 is granted access to the memory bus 28 again in the manner described in the text accompanying FIG. 9, with the exception that the GRANT#1 signal merely remained at a logical ONE.

Likewise, in the period of time indicated at 252, there is contention, so that when the PCI arbiter asserts the ACC-C signal, the time slot pointer increments to slot n+2, which has a ZERO assignment value associated with it. Thus, as shown in the period at 254, the memory bus 58 is accessed by the MCA bus.

Similarly, in the periods of time indicated by 256, 258, 260, and 262, there is contention; therefore, the time slot pointer increments to the next position. As shown, in time periods 256, 258, 260, and 262, the memory bus 58 is sequentially accessed by the PCI bus, the PCI bus, the PCI bus, and the MCA bus, respectively.

Referring now to FIG. 11, a timing diagram showing the events of FIGS. 9, 10A, and 10B are shown more closely to scale. The period of time indicated at 264 shows the events of FIGS. 10A and 10B with the peripheral buses contending for access to the memory bus 58. The period of time indicated at 266 shows the events of FIG. 9 with the peripheral buses accessing the memory bus 58 without contention.

Significantly, the assignment value can be altered dynamically by the CPU 50 thereby dynamically changing the ratio of accesses by each peripheral bus. This is useful for tailoring the accesses to the memory bus 58 depending on one or more parameters of the peripheral buses 76, 82. For example, if the current assignment value is $11001100_2$ (with an associated access ratio of 1:1 in favor of neither bus and with an access time ratio of 1.5 µs:5µs in favor the MCA bus) and if a device 78a on the PCI bus 76 begins performing a real-time activity with critical timing that requires nearly constant accesses to the memory bus 58, then the assignment value can be altered accordingly. Changing the value from $11001100_2$ to $11111110_2$ changes the access ratio from 1:1 to 7:1 in favor of the PCI bus and changes the access time ratio to 7×1.5 µs=10.5 µs:5 µs or over 2:1 in favor of the PCI bus, in this example.

In the particular embodiment described above, the multibus arbiter 90 waits for the device on the peripheral bus accessing the memory bus 58 to finish using the bus 58. In the alternative, the arbiter 90 can be configured to limit the length of time each device accesses the memory bus 58.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, the circuitry can be modified to arbitrate between three or more dissimilar peripheral buses, with the assignment register 110 having enough bits (e.g., three bits) per time slot pointer position to adequately store the identity of the bus associated with each time slot. As another example, a multibus arbiter can be configured to arbitrate between two buses of the same type, e.g., two separate PCI buses or two separate MCA buses. As yet another example, the circuits shown are fairly conservative in that setup times are easily met with the penalty being that sometimes signals are delayed by several clock cycles. It should be apparent to those skilled in the art that more aggressive circuits can be designed to perform the same functions. Therefore, the invention in its broader aspects is not limited to the specific details, representative apparatus and method, and illustrative examples shown and described. Accordingly, departures may be made from such details without departing from the spirit or scope of the applicant's general inventive concept.

I claim:

1. A multibus computer system, comprising:
   (a) a central processing unit (CPU) having a host processor bus associated therewith;
   (b) a plurality of bus controllers in circuit communication with said CPU for controlling information transfer over a plurality of peripheral buses;
   (c) a bus arbiter for arbitrating accesses between each of said peripheral buses; and
   (d) a dynamically alterable time slot assignment register in circuit communication with said CPU and said bus arbiter for dynamically storing a time slot assignment value responsive to said CPU, said time slot assignment value being dependent upon the average access time of each of said plurality of busses to said host processor bus and being used to directly divide accesses to one of said bus controllers, among the others of said plurality of bus controllers, with one access to said one bus controller being granted per time slot position during contention for accessing said one bus;
   whereby the bandwidth of said host processor bus is allocated between said peripheral buses.

2. A multibus computer system according to claim 1, wherein the average access time of one of said plurality of busses to said host processor bus is about the same as the average access time of another of said plurality of busses to said host processor bus during contention between said one bus and said other bus for access to said host processor bus.

3. A multibus computer system according to claim 1, wherein the average access time of one of said plurality of busses to said host processor bus is about 9 microseconds and the average access time of another of said plurality of busses to said host processor bus is about 10 microseconds during contention between said one bus and said other bus for access to said host processor bus.

4. A multibus computer system, comprising:

(a) a central processing unit (CPU) having a host processor bus associated therewith;

(b) a memory controller in circuit communication with said CPU via the host processor bus and having a memory bus and a memory bus arbiter associated therewith;

(c) a memory in circuit communication with said memory controller via the memory bus;

(d) a first peripheral bus controller in circuit communication with said CPU and said memory controller, having a first peripheral bus and a first peripheral bus arbiter associated therewith, and configured to request access to said memory via said memory bus arbiter of said memory controller;

(e) a second peripheral bus controller in circuit communication with said CPU and said memory controller, having a second peripheral bus and a second peripheral bus arbiter associated therewith, and configured to request access to said memory via said memory bus arbiter of said memory controller; and (f) a multibus arbiter in circuit communication with said CPU, said first and second peripheral bus arbiters, and said memory bus arbiter and including:

(1) an assignment register for storing a fixed predetermined multi-position time slot assignment value, each position of which has at least one data bit associated therewith, the time slot assignment value being dependent upon the average access time of said first peripheral bus to said memory bus and the average access time of said second peripheral bus to said memory bus and being used to predetermine the ratio of accesses to said memory bus by said first peripheral bus to accesses to said memory bus by said second peripheral bus during contention;

(2) a time slot pointer having at least one position for each position of said time slot assignment register and configured to select at least one of the time slot pointer positions and further configured to select a different time slot pointer position at least partially responsive to both of said peripheral bus arbiters requesting access to the memory bus; and (3) an arbitration circuit in circuit communication with said memory bus arbiter, said time slot assignment register, and said time slot pointer and configured to determine which of said peripheral buses will be given access to the memory bus responsive to (i) the memory bus arbiter granting access to the memory bus, (ii) the selected time slot pointer position, and (iii) the value of the position of the time slot assignment value associated with the selected time slot pointer position;

wherein the bandwidth of the memory bus is allocated between said peripheral buses.

5. A multibus computer system according to claim 4, wherein the average access time of said first peripheral bus to said memory bus is about the same as the average access time of said second peripheral bus to said memory bus during contention between said first and second peripheral busses for access to said host processor bus.

6. A multibus computer system according to claim 4, wherein the average access time of said first peripheral bus to said memory bus is about 9 microseconds and the average access time of said second peripheral bus to said memory bus is about 10 microseconds during contention between said first and second peripheral busses for access to said host processor bus.

7. A multibus computer system, comprising:

(a) a central processing unit (CPU) having a host processor bus associated therewith;

(b) a memory controller in circuit communication with said CPU via the host processor bus and having a memory bus and a memory bus arbiter associated therewith;

(c) a memory in circuit communication with said memory controller via the memory bus;

(d) a first peripheral bus controller in circuit communication with said CPU and said memory controller, having a first peripheral bus and a first peripheral bus arbiter associated therewith, and configured to request access to said memory via said memory bus arbiter of said memory controller;

(e) a second peripheral bus controller in circuit communication with said CPU and said memory controller, having a second peripheral bus and a second peripheral bus arbiter associated therewith, and configured to request access to said memory via said memory bus arbiter of said memory controller; and (f) a multibus arbiter in circuit communication with said CPU, said first and second peripheral bus arbiters, and said memory bus arbiter and including:

(1) a dynamically alterable assignment register for dynamically storing a predetermined multi position time slot assignment value which is dependent upon the average access time of the first and second peripheral busses, each position of which has at least one data bit associated therewith, the assignment value predetermining the ratio of access to said memory bus by said first peripheral bus to access to said memory bus by said second peripheral bus during contention;

(2) a time slot pointer having at least one position for each position of said assignment register and configured to select at least one of the time slot pointer positions and further configured to select a different time slot pointer position at least partially responsive to both of said peripheral bus arbiters requesting access to the memory bus; and (3) an arbitration circuit in circuit communication with said memory bus arbiter, said assignment register, and said time slot pointer and configured to determine which of said peripheral buses will be given access to the memory bus responsive to (i) the memory bus arbiter granting access to the memory bus, (ii) the selected time slot pointer position, and (iii) the value of the position of the time slot assignment value associated with the selected time slot pointer position;

wherein the bandwidth of the memory bus is allocated between said peripheral buses.

8. A multibus computer system according to claim 7, wherein the parameter said time slot assignment value is dependent upon is related to the average access time of said first peripheral bus to said memory bus and the average access time of said second peripheral bus to said memory bus.

9. A multibus computer system according to claim 8, wherein the average access time of said first peripheral bus to said memory bus is about the same as the average access time of said second peripheral bus to said memory bus during contention between said first and second peripheral busses for access to said host processor bus.

10. A multibus computer system according to claim 8, wherein the average access time of said first peripheral bus to said memory bus is about 9 microseconds and the average access time of said second peripheral bus to said memory bus is about 10 microseconds during contention between said first and second peripheral busses for access to said host processor bus.

11. A method of arbitrating accesses to a memory between first and second peripheral buses, comprising the steps of:

(a) providing a computer system having (i) a central processing unit (CPU) having a host processor bus associated therewith, (ii) a memory controller in circuit communication with the CPU via the host processor bus and having a memory bus and a memory bus arbiter associated therewith, (iii) a memory in circuit communication with the memory controller via the memory bus, (iv) a first peripheral bus controller in circuit communication with the CPU and the memory controller, having a first peripheral bus and a first peripheral bus arbiter associated therewith, and configured to request access to the memory via the memory bus arbiter of the memory controller, (v) a second peripheral bus controller in circuit communication with the CPU and the memory controller, having a second peripheral bus and a second peripheral bus arbiter associated therewith, and configured to request access to the memory via the memory bus arbiter of the memory controller, and (vi) a multibus arbiter in circuit communication with the CPU, the first and second peripheral bus arbiters, and the memory bus arbiter and including: a dynamically alterable an assignment register for dynamically storing a multi-position time slot assignment value, each position of which has at least one data bit associated therewith, a time slot pointer having at least one position for each position of the assignment register, and an arbitration circuit in circuit communication with the memory bus arbiter, the assignment register, and the time slot pointer;

(b) dynamically storing a fixed predetermined multi-position assignment value in the writable assignment register, each position of which value corresponds to either the first peripheral bus or the second peripheral bus, thereby predetermining the ratio of accesses to the memory bus by the first peripheral bus to accesses to the memory bus by the second peripheral bus during contention;

(c) determining at least one parameter of the first and second peripheral buses;

(d) dynamically altering the assignment value stored within the assignment register depending on the value of the average access time of the first and second peripheral buses, thereby changing, during contention, the ratio of accesses to the memory bus by the first peripheral bus to accesses to the memory bus by the second peripheral bus.

(e) selecting a time slot pointer position;

(f) changing the selected time slot pointer position at least partially responsive to the first and second peripheral buses requesting access to the memory bus;

(g) granting access to the memory responsive to (i) the memory bus arbiter granting access to the memory bus, (ii) the selected time slot pointer position, and (iii) the value of the position of the time slot assignment value associated with the selected time slot pointer position;

whereby the bandwidth of the memory bus is allocated between said peripheral buses.

12. A method of arbitrating accesses to a memory between first and second peripheral buses according to claim 11, wherein the parameter is related to the average access time of the first peripheral bus to the memory bus and the average access time of the second peripheral bus to the memory bus.

13. A method of arbitrating accesses to a memory between first and second peripheral buses according to claim 12, wherein the average access time of the first peripheral bus to the memory bus is about the same as the average access time of the second peripheral bus to the memory bus during contention between said first and second peripheral busses for access to said host processor bus.

14. A method of arbitrating accesses to a memory between first and second peripheral buses according to claim 12, wherein the average access time of the first peripheral bus to the memory bus is about 9 microseconds and the average access time of the second peripheral bus to the memory bus is about 10 microseconds during contention between said first and second peripheral busses for access to said host processor bus.

* * * * *